June 6, 1933.                    W. S. DAVENPORT                    1,912,515
                                AUTOMATIC MACHINE TOOL
                                Filed Sept. 2, 1930               4 Sheets-Sheet 1
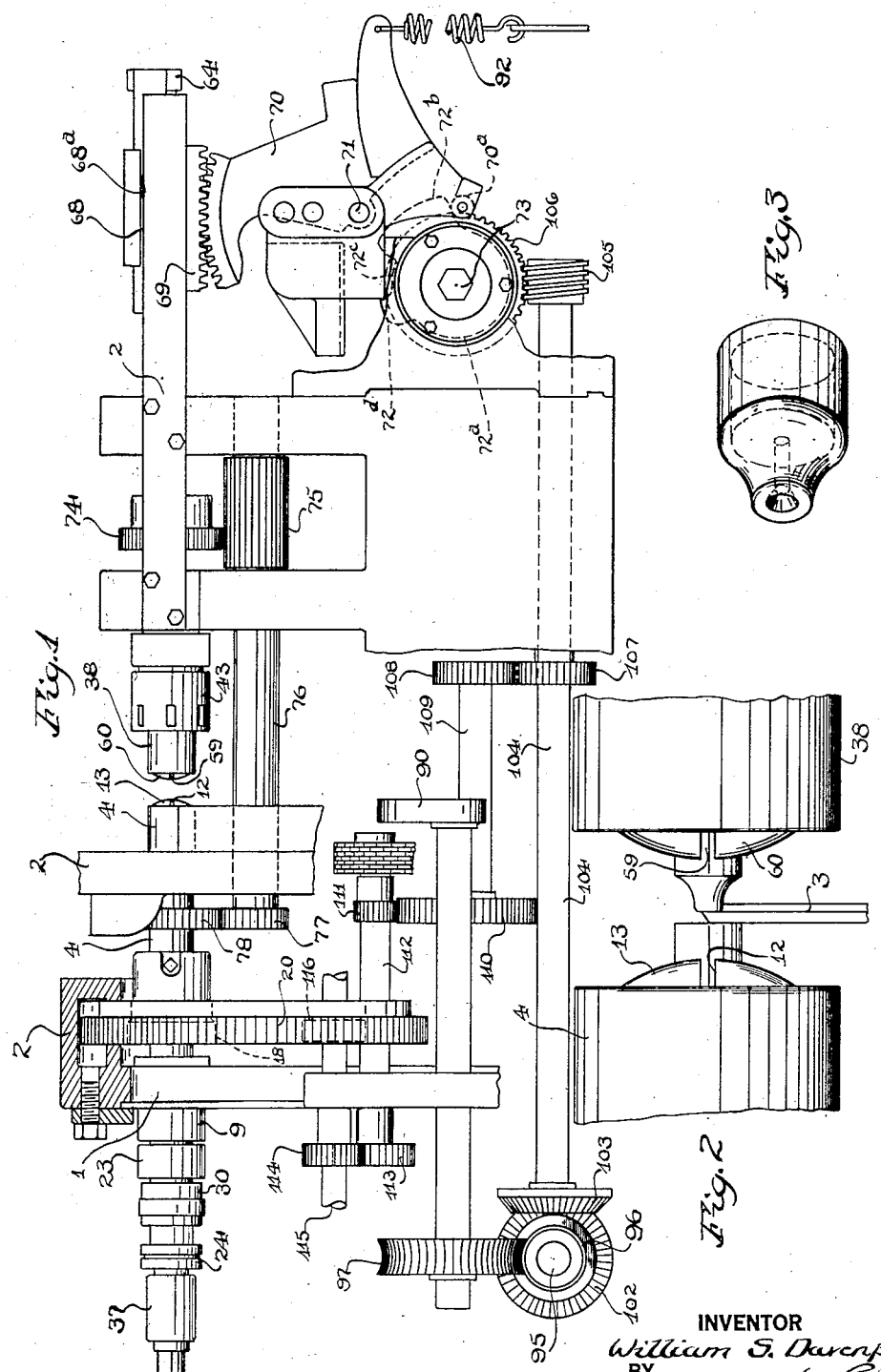

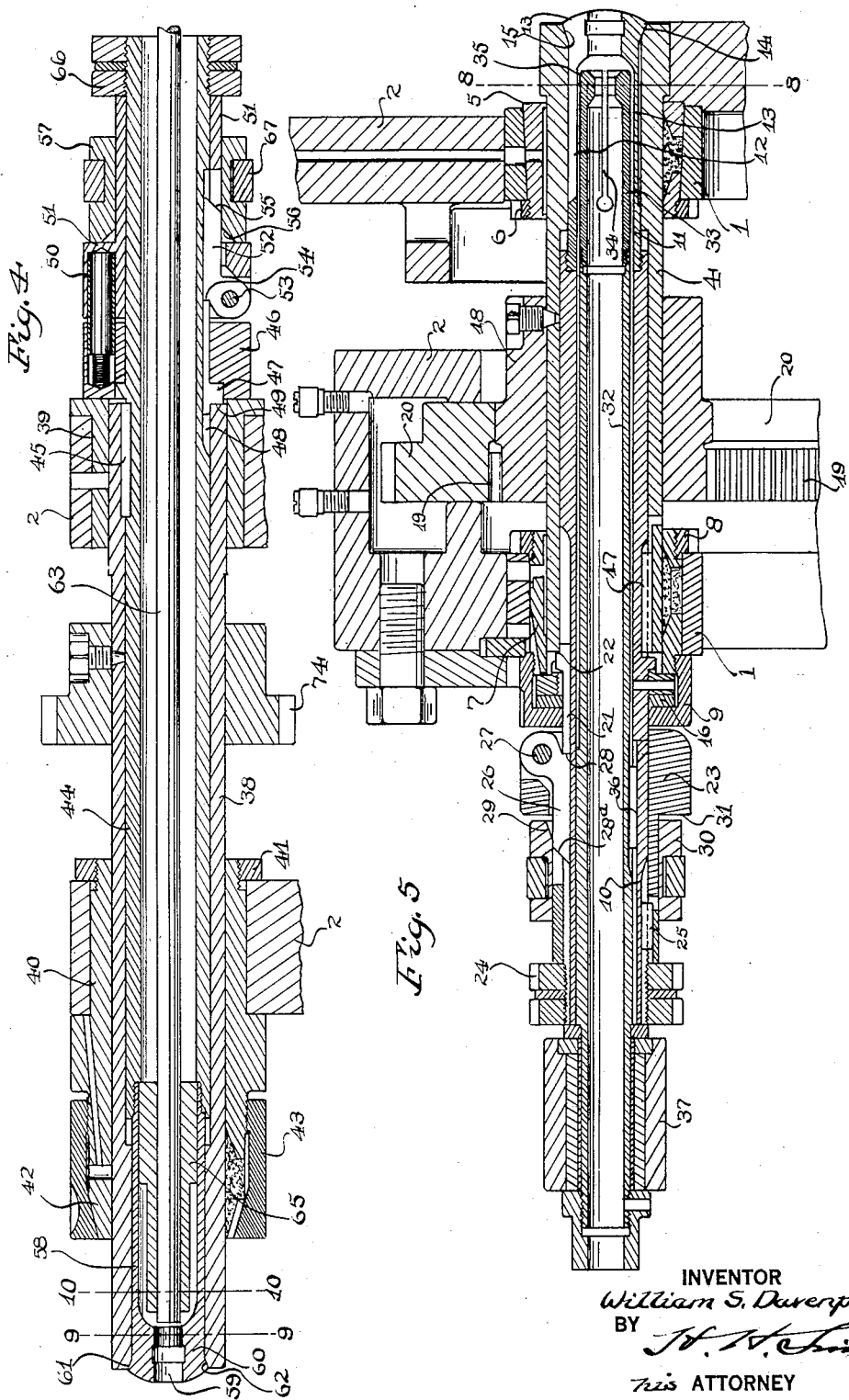

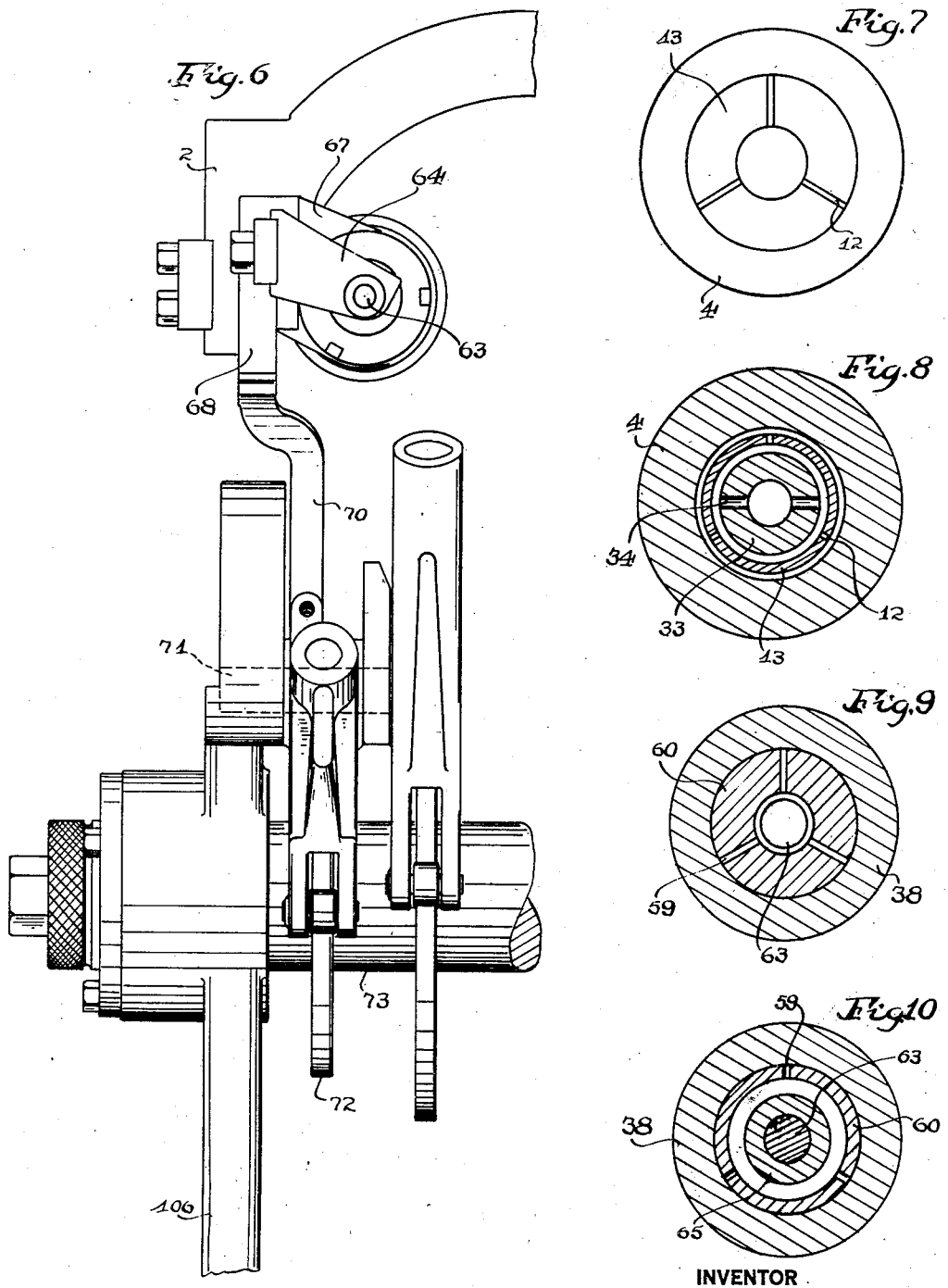

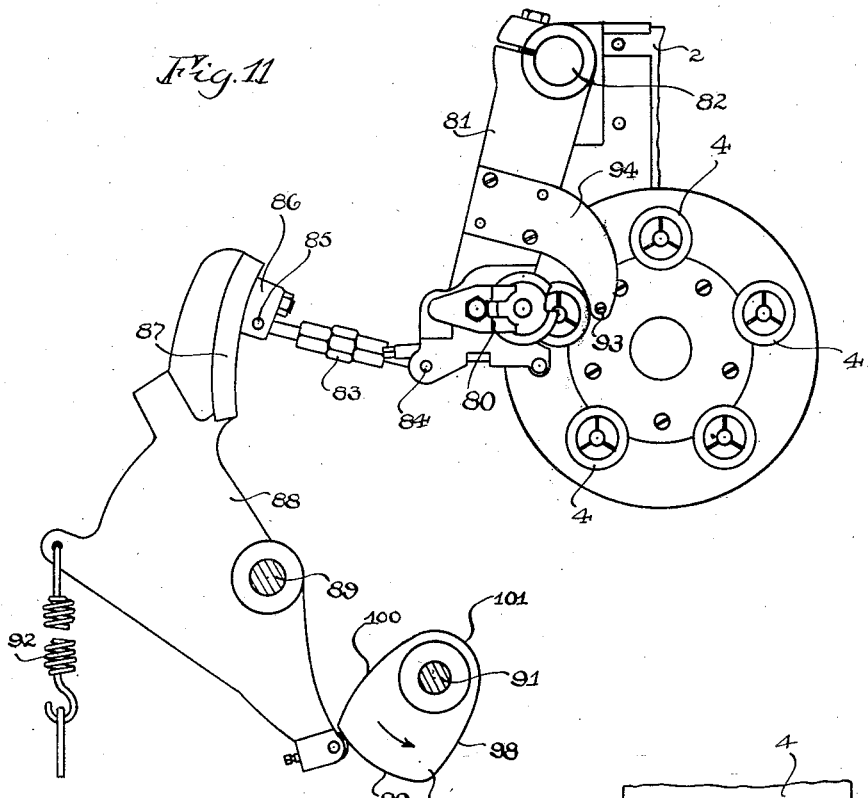
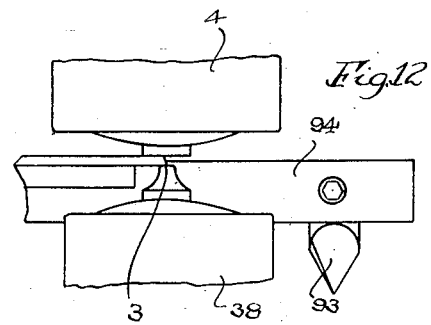
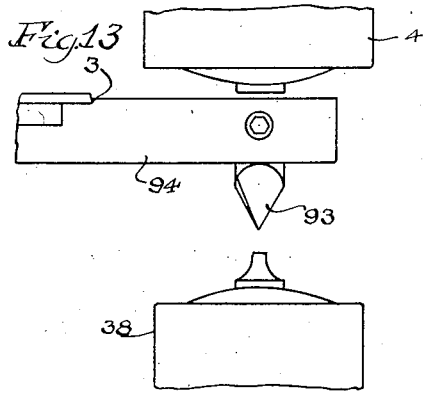
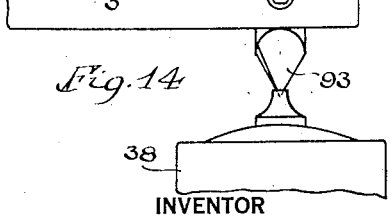

Patented June 6, 1933

1,912,515

UNITED STATES PATENT OFFICE

WILLIAM S. DAVENPORT, OF ROCHESTER, NEW YORK, ASSIGNOR TO DAVENPORT MACHINE TOOL CO., INC., OF ROCHESTER, NEW YORK, A CORPORATION

AUTOMATIC MACHINE TOOL

Application filed September 2, 1930. Serial No. 479,211.

The present invention relates to automatic machine tools and more particularly to the type in which a rod or strip of material is advanced successively to a position on a rotary work holder where a portion of such rod or piece is cut off or severed. An object of this invention is to provide a machine which is simple in construction and operation and in which the piece to be severed or cut off is engaged by a supporting means which will support and rotate the work during and after the severing action in order that no teat or burr will be present on the severed or cut off work piece and/or that other operations, such for instance as end cutting, may be performed on the severed piece.

Another object of the invention is to provide in connection with an automatic machine tool which severs a piece from a rod, bar or the like, a mechanism for end cutting the severed piece before it is discharged from the support in which it is held during the severing operation.

To these and other ends, the invention consists of certain parts and combinations of parts, all of which will be hereinafter described: The novel features being pointed out in the appended claims.

In the drawings:

Fig. 1 is a fragmentary side view of an automatic machine tool embodying the present invention, parts being shown in section;

Fig. 2 is a detail view showing the manner in which the work strip is supported while being divided or cut;

Fig. 3 is a detail view showing a severed portion of the work piece;

Fig. 4 is a longitudinal section through the work support;

Fig. 5 is a longitudinal section through one of the work holders or spindles;

Fig. 6 is a fragmentary end view of the work support and its operating devices;

Fig. 7 is an end view of the work clamp of the work support;

Fig. 8 is a section on the line 8—8, Fig. 5;

Fig. 9 is a section on the line 9—9, Fig. 4;

Fig. 10 is a section on the line 10—10, Fig. 4;

Fig. 11 is a transverse section through the machine showing the construction and operation of the severing and end cutting mechanism;

Fig. 12 is a fragmentary bottom view showing the severing mechanism in severing position;

Fig. 13 is a fragmentary bottom view showing the end cutting tool aligned with the severed piece; and Fig. 14 is a fragmentary bottom view showing the end cutting tool operating on the severed piece.

Heretofore, in automatic machine tools, there has been produced generally a burr or teat on the severed end of the cut off piece due to the fact that during the severing action the piece to be severed or cut off is unsupported and not rotated except from the spindle through which the work has been fed. This has required a separate operation to remove this teat. Prior suggestions have been made to overcome this objection but the mechanisms suggested have been complicated in action and not convenient to operate. According to this invention, there is provided a novel supporting mechanism for the severed or cut off piece, which is simple in construction and operation and which will rotate and support the severed piece after the severing action has been completed so that the teat or burr may be removed, and other operations, such as counterboring, reshaping or drilling, or other end cutting operations, may be performed on the severed piece without removing the latter from the supporting means.

The invention is, in this instance, illustrated in an automatic machine tool which has a rotary multiple spindle carrier 1 turning in a frame 2, carrying a plurality of work holders or spindles and rotatable to carry the work holders or spindles successively to a severing cutter or tool 3 supported in any suitable manner, as for instance, in the manner to be described.

Each work holder or spindle comprises an outer tubular member 4 journalled in the carrier 1 in two spaced bearings. The front bearing, in this instance, is in the form of an externally tapered sleeve 5 fitted through a portion of the carrier 1 and held therein by a nut 6. The rear bearing embodies a bearing sleeve 7 passed through a portion of the carrier 1 and held therein by a nut 8 and a cap 9. The tubular member 4 extends beyond the bearing sleeve 5 and is capable of a slight longitudinal movement. Arranged within the outer tubular member 4 is tubular member 10 which carries at its inner end a work clamp comprising, in this instance, a tubular structure 11 detachably connected to the tubular member 10 and formed at its ends with slits or slots 12 providing spring jaws 13 between them. The outer faces of these jaws are bevelled at 14 to engage an interior annular bevelled or inclined surface 15 on the outer tubular member 4. The tubular member 10 is held against longitudinal movement by means of a collar 16 fast thereon which lies within the cap 9 between the latter and the end of the bearing 7, the tubular member 10 projecting through the cap 9 and beyond the rear end of the member 4. A key 17 connects the tubular member 10 with the tubular member 4 so that the member 10 turns with the tubular member 4 while permitting longitudinal movement of the member 4. Rotation of both tubular members 4 and 10 is effected by providing the member 4 with a surrounding gear 18 which meshes with internal teeth 19 on a rotary ring 20 meshing with like gears 18 on all of the work holding devices on the multiple spindle carrier.

Movement of the tubular member 4 axially is effected, in this instance, by a shifter key 21 guided in an external groove in the tubular member 10 and having a shoulder 22 which is adapted to engage the end of the tubular member 4. For moving this shifter 21 longitudinally, a sleeve 23 surrounds the tubular member 10 between the collar 9 and nuts 24 on said member 10. This sleeve has a slight longitudinal movement on the member 10 but is, by a key 25, caused to turn with the member 10. A shifter operator 26 is pivoted at 27 to this sleeve and has a shoulder 28 adapted to engage the end of the shifter key 21. The shifter operator also has a bevelled portion 28ª adapted to be engaged by an annular bevelled portion 29 on a ring 30 which is movable axially on the sleeve 23 to engage the shoulder 31 on the latter. Movement of the collar or the ring 30 in one direction causes the shifter 21 to move the outer tubular member 4 in a direction to force the jaws 13 on the work piece, while movement of the ring 30 in the other direction releases the tubular member 4 and permits the latter to be shifted by the spring jaws 13.

The work piece in the form of a strip or rod of material is fed to the jaws 13, in this instance, by a feeding means comprising a tubular member 32 extending through the tubular member 10 and having detachably secured to its inner end a tubular gripping device 33 in the form of a sleeve provided with longitudinally extending slots 34 forming jaws 35 between them. This tubular member is, through a key 36, caused to turn with the tubular members 4 and 10 but is adapted to move longitudinally of said members so as to feed the work to the work clamping jaws 13. The jaws 35 merely frictionally engage the work strip or rod and slide on the same away from the jaws 13 while such strip is held by the jaws 13 and shift the strip toward the jaws 13 when the latter releases the strip. This movement of the tubular member 32 is effected through a means which operates on a collar 37 mounted to turn on the outer end of the tubular member 32, the work piece extending through the feeding tube 32.

A feature of this invention is to support the projecting end of the work piece of each rotary work holder or spindle while the work piece is being operated upon by the cutter or dividing tool 3. This supporting means is preferably common to all of the rotary work holders or spindles and the rotation of the multiple spindle carrier brings the work holders successively to the common work support.

In the illustrated embodiment of the invention, the support for the projecting end of the work piece or piece to be severed comprises an outer tubular member 38 which is mounted to turn in two bearings on the main frame 2 and also to move longitudinally in said bearings. One of the bearings is in the form of a sleeve 39 passed through a portion of the main frame, and the other bearing is in the form of a sleeve 40 passed through a portion of the main frame 2 and held therein by a nut 41. This bearing sleeve 40 projects from the main frame and has a tapered portion 42 over which a screw cap 43 is fitted.

Within the tubular member 38 is arranged a tubular member 44 which, by a key 45, is caused to turn with the tubular member 38, this key permitting a slight longitudinal movement of the tubular member 38 with reference to the member 44. The member 44 has its movement toward the rotary work holder limited by a collar 46 which turns with the tubular member 44 and cooperates with the bearing 39.

Connection between the tubular member 38 and the tubular member 44 is established through a shifter key 47 operable in a way 48 in the tubular member 44 and having a shoulder or abutment 49 adapted to engage the adjacent end of the tubular member 38 to shift the latter longitudinally. The collar 46 carries a plurality of spring pressed plungers 50 which abut one end of a sleeve 51 slidable on the tubular member 44 beyond the end of the tubular member 38. This sleeve 51 is mounted to turn with the tubular member 44 and carries an operator 52 for the shifter key 47. The operator 52 is pivoted at 53 to the sleeve, lies in the groove 48 and has a shoulder 54 for cooperating with an end of the shifter key 47. The operator also has a bevelled portion 55 adapted to be engaged by an internal annular bevel 56 on a collar 57 which turns on the sleeve 51.

At its inner end, the tubular member 44 carries a work clamp comprising, in this instance, a detachable tubular structure 58 provided with longitudinal splits 59 forming resilient jaws 60. The inner faces of these jaws clamp the projecting work piece, while the outer faces are provided with cams or bevels 61 which are adapted to engage an internal annular bevelled or cam surface 62 on the end of the tubular member 38.

The operation of the jaws of the rotary work support to effect the gripping of the projecting end of the work piece is effected as follows: When the tubular member 44 moves toward the projecting work piece, the jaws 60 are expanded so that, due to the centered relation between work holder and the rotary support, the projecting end passes into the jaws. Later the collar 48 engages the end of the bearing 39 so that the sleeve 51 is moved to compress the springs of the spring pressed plunger 50. The shoulder 54 on the key operator 52 now shifts the key 47 so that its shoulder will shift the tubular member 38 in order to cause the cam surface 62 to force the jaws 60 on the work piece. After the work piece has had the portion held by the work support divided therefrom the carriage 68 again shifts to move the tubular member 44. When the collar 57 moves away from the enlargement on the sleeve 51, the spring pressed plungers shift the sleeve 51 on the tubular member 44 so that the key 47 is released, and the resiliency of the jaws 60 force the tubular member 38 a slight distance to release the jaws and the work piece. The two tubular members then move together away from the multiple spindle carrier.

With the end in view of ejecting the divided or separated pieces of the work from the work support, an ejecting means is provided comprising, in this instance, a rod 63 which is supported at its outer end by a bracket 64 from the frame 2 so as to be rigid with the frame 2. The inner end of the rod is guided in a guide sleeve 65 which is detachably arranged within the tubular work holder 58. While the work supporting jaws 60 are gripping the projecting portion of the work piece, the end of the ejector rod lies out of engagement with the work piece, but, when the work supporting means moves longitudinally to a certain position away from the multiple spindle carrier, the ejector passes between the jaws and pushes the divided or separated work piece from the work support.

The cutting or severing mechanism in the illustrated embodiment of the invention comprises a cutter holder 80 mounted on an arm 81 which is suspended from the frame 2 above the spindle carrier 1 on a pivot 82. The swinging of this arm to move the latter back and forth may be effected by an extensible link 83 pivoted at 84 to the tool holder 80 and pivoted at 85 to a block 86 which is adjustable on an arc-shaped guide 87 on one arm of a rocking lever 88 which is pivoted to a shaft 89 on the main frame 2 and which is moved in one direction by a cam 90 on a shaft 91 and in the other direction by a spring 92 anchored at a suitable point on the frame 2.

Also mounted on the swinging arm 81 is an end cutting tool, in this instance in the form of a counterboring tool or countersinking tool 93, which is supported by a depending bracket 94 projected laterally from the arm 81 above the cutter 3. When the cutter 3 is operating, as shown in Figs. 11 and 12, the tool 93 lies to one side of the work support, but as the cutter 3 moves away from the severed piece, the latter moves axially away from the cutter 3 so that the tool 93 may be moved into axial alinement with the severed piece, as shown in Fig. 13, after which the severed piece is moved axially against the tool 93 until the proper amount of cutting occurs.

Movement of the support for the severed piece axially is effected, in this instance, through the collar 57 which works between an enlargement on the sleeve 51 and an enlargement or flange 66 on the tubular member 44. As illustrated, an arm 67 on a sliding carriage 68 is guided on a guide 68ᵃ on the main frame 2 and connects with this collar. This carriage is provided with a rack 69 which meshes with a rocking gear segment 70 pivoted at 71 to the main frame 2 and engaged by a cam 72 on the shaft 73. This cam 72 has a low point 72ᵃ throughout the major portion of its periphery engaged by the roller 70ᵃ on the rocking segment while the rotary support for the severed piece is in its extreme position away from the multiple spindle carrier. Following the portion 72ᵃ, the cam has a high portion 72ᵇ which holds the support for the severed piece toward the multiple spindle carrier during the cutting action by the cutter 3. Following the high portion 72ᵇ is a drop 72ᶜ which is not so low as the portion 72ᵃ and during which time the support for the severed piece occupies the position shown in Fig. 3, the severed piece being carried away from the multiple spindle carrier but not so far as to cause release and ejection thereof from the supporting means. Next following on the cam is an elevated portion 72ᵈ which is not so high as the portion 72ᵇ and holds and moves the severed piece toward the tool 93, as shown in Fig. 14, to produce the end cutters. As the roller 70ᵃ passes from the cam portion 72ᵈ, it again reaches the portion 72ª and at the ejecting means comes into action and ejects the severed piece from its supporting means.

The operations of the cutter or severing tool and the end cutting tool take place in timed relation to the axial movement of the supporting means for the severed piece. A power shaft 95 has a worm 96 thereon meshing with a worm gear 97 on the shaft 91 which carries the cam 90. This cam 90 has four surfaces 98, 99, 100, and 101. The surface 98 advances the cutter 3 to cutting position, the surface 99 causes the cutter to pass through the work, the surface 100 permits the cutter 3 to move away from the work under the action of the spring 92, the surface 101 holds the end cutting tool 93 stationary while the rotary support for the severed piece turns and advances toward and from the tool 93.

The shaft 95 through a gear 102 thereon meshes with a gear 103 on a shaft 104 which carries a worm 105 meshing with the worm wheel 106 on the shaft 73 which carries the cam 72 and operates the support for the severed piece back and forth.

The rotation of the work piece is, in this instance, also effected from the shaft 95, by means of a gear 107 on the shaft 104 meshing with a gear 108 on a shaft 109 which carries a gear 110. The latter meshes with a gear 111 on a shaft 112 which carries a pinion 113 meshing with a gear 114 on a shaft 115 having a pinion 116 which meshes with the gear 20 for turning all of the work holders of the spindle carrier.

It is desirable that the rotary work support turns at the same axial speed as the rotary work holders, and to this end, a gear 74 is secured to the tubular member 38 and meshes with a gear 75 which is elongated so that the gear 74 may move axially thereon. The gear 75 is mounted on a shaft 76 which carries a gear 77, the latter meshing with a gear 78 on the tubular member 4. The shaft 76 is axially alined with the axis of rotation of the internal gear 20 so that the shaft 76 will be driven from the internal gear 20 at a point to which the gear 78 may be adjusted. The gears 74, 75, 77, and 78 all being of the same diameter, the rotary support for that portion of the work piece projecting from any one of the work holding devices on the multiple spindle carrier will turn at the same axial speed as the axial speeds of each of the rotary work holders.

With this invention, when each work holder carries a work strip or rod to the cutter or divider, the work support moves toward the projecting end of the work piece, clamps such projecting end and holds the clamped portion while the cutter or divider is separating a portion of the work piece from the main part. The separation of a portion of the work piece occurs without providing a teat or burr on either the main or separated part of the work piece. After the separation of a portion of the work piece from the main part, the rotary support for the separated part carries the latter away from the work holder, without ejecting the severed piece, and during this time the end cutting tool moves to operative position, so that the severed piece on moving again toward the end cutting tool is end cut. After this end cutting action, the support for the severed piece moves to its extreme position away from the spindle carrier and the severed piece is released and ejected. The multiple spindle carrier now turns and presents another projecting portion of a work piece to the work support and the latter moves again forwardly to clamp the projecting portion. The cutter moves again into cutting relation with the projecting portion and the operation is repeated.

What I claim as my invention and desire to secure by Letters Patent is:

1. In an automatic machine tool, the combination with a rotary multiple spindle carrier, a plurality of work holding spindles carried by the spindle carrier, a cutter to which the work holding spindles are carried one at a time to permit such cutter to operate on a projecting portion of a work piece carried by each spindle, and mechanism for turning the spindles on the spindle carrier, of a rotary work support to which each spindle is carried one at a time to support a projecting end of a work piece on such spindle, and means for turning independently of the work the rotary work support at an angular velocity which is the same as that of the work-holding spindle which is then operatively associated with the work support, said means being operated by each spindle when the latter is carried to the rotary work support.

2. In an automatic machine tool, the combination with a rotary multiple spindle carrier, a plurality of work holding spindles carried by the spindle carrier, a cutter to which the work holding spindles are carried one at a time to permit such cutter to operate on a projecting portion of a work piece carried by each spindle, and mechanism for turning the spindles on the spindle carrier, of a rotary work support to which each spindle is carried one at a time to support a projecting end of a work piece on such spindle, and means for turning the rotary work support, said means being operated by each spindle when the latter is carried to the rotary work support and comprising a gear on each spindle, a gear on the rotary work support, and a counter shaft having two gears, one meshing with the gear on the work support and the other adapted for engagement by the gear on each spindle as the latter is brought to the rotary work support so that the latter may be driven from the spindles.

3. In an automatic machine tool, the combination with a rotary work holding clamp, and a rotary and axially movable clamp for supporting the projecting end of a work piece on the first named clamp, of a rack carried by the second named clamp, a gear sector meshing with the rack, a rotary cam for effecting the movement of the gear sector to move the second named clamp toward the first named clamp, and a spring for moving the gear sector in the opposite direction.

4. In an automatic machine tool, the combination with a rotary work holder, and means for feeding the work in the work holder in the direction of the axis of turning of the work holder to cause the work to project from the work holder, of a rotary axially movable work support having means for clamping the projecting portion of the work, means for severing the work between the holder and the support, a cutting tool, and means for moving the cutting tool to an alined position between the holder and the support to cut the end of the severed piece through the rotation of the piece by said work support.

5. In an automatic machine tool, the combination with a rotary work holder, and means for feeding the work in the work holder in the direction of the axis of turning of the work holder to cause the work to project from the work holder, of a rotary axially movable work support having means for clamping the projecting portion of the work, means for severing the work between the holder and the support, a cutting tool, and means for moving the cutting tool to an alined position between the holder and the support to cut the end of the severed piece through the rotation of the piece by said work support, and a common support for the severing means and the end cutting tool moving one to operative position as the other moves out of operative position.

6. In an automatic machine tool, the combination with a rotary work holder, and means for feeding the work in the work holder in the direction of the axis of turning of the work holder to cause the work to project from the work holder, of a rotary axially movable work support having means for clamping the projecting portion of the work, a movable support, a cutter and a nonrotating end cutting tool mounted on the support, means for moving the support to one position to cause the cutter to operate on the work and to another position where the end cutting tool is in a position between the work holder and the severed piece alined with the latter, and means for controlling the rotary support to hold the latter against axial movement during the cutting and to move the same toward and then from the end cutting tool when the latter is positioned between the work holder and the work support.

7. In an automatic machine tool, the combination with a rotary work holder, and means for feeding the work in the work holder in the direction of the axis of turning of the work holder to cause the work to project from the work holder, of a rotary axially movable work support having means for clamping the projecting portion of the work, means for severing the work, a nonrotating end cutting tool, mechanism for moving the severing means toward and from operative position, and for moving the end cutting tool toward and from operative position in a line with the axis of the severed piece between the latter and the work holder, and mechanism for controlling the axial movement of the rotary work support to hold the latter against axial movement during the severing operation and after such severing operation to move the work support axially away from the work holder to permit the end cutting tool to pass to operative position and then axially toward and from the end cutting tool to cause the latter to pass to and from the severed piece.

8. In an automatic machine tool, the combination with a rotary work holder, and means for forwardly feeding the work axially through the holder to cause the work to project from the holder, of a severing mechanism for operating on the projecting portion of the work, a rotary and axially movable work support for clamping the projecting portion of the work beyond the field of operation of the severing means, mechanism for operating the severing mechanism into and out of operative position, mehanism for controlling the axial movment of the work support to move the latter into clamping engagement with the work before the severing mechanism operates thereon, to hold the work support against axial movement in clamping engagement with the work while the severing mechanism is operating thereon, and to move the work support with the severed piece clamped thereto forwardly away from the work holder after the severing operation, and mechanism for bringing a finishing tool along a lateral path and for effecting relative, longitudinal movement as between the finishing tool and the severed piece whereby the finishing tool can, because of the longitudinal movement, operate upon the rear portion of the severed section.

9. An automatic machine tool comprising a rotary work holder, means for feeding the work on the work holder in the direction of the axis of turning of said work holder, a rotary work support having means for clamping a work piece projecting from the work holder, mechanism for turning said work holder and work support at the same speed about a common axis independently of the work, a cutter for operating on the work between the work holder and the work support, and a longitudinally movable tool which, by a lateral movement, enters the space provided because of the cutting operation upon the work.

10. An automatic machine tool comprising a rotary multiple spindle carrier, a plurality of rotary work clamping devices carried by the spindle carrier, a cutter to which the work clamping devices are successively moved on the turning of the spindle carrier, means for advancing and retracting the cutter, a single work supporting device mounted to support a projecting portion of a work piece of each of the work clamping devices while the work pieces of said clamping devices are being operated upon by the cutter, the work support being mounted to turn about a fixed axis parallel with the axis of rotation of the spindle carrier, and the work clamping devices on the carrier being mounted to turn each about an axis of rotation parallel with the axis of rotation of the carrier and being carried by the carrier to aline with the axis of rotation of the work support when the work piece of such clamping device is being operated upon by the cutter, a finishing tool which functions as the result of relative, longitudinal movement between it and the work support while the work support is turning about its fixed axis, and means for laterally moving the finishing tool from an inoperative position to a position whereby as the result of the relative, longitudinal movement it can operate upon a piece carried in and rotated by the work support.

11. An automatic machine tool comprising a rotary multiple spindle carrier, a plurality of work clamping devices carried by the multiple spindle carrier, a cutter to which the work clamping devices are successively moved on the turning of the spindle carrier, means for advancing and retracting the cutter, a single work support mounted to grip and support a projecting portion of a work piece of each of the work clamping devices while the work pieces of said clamping devices are being operated upon by the cutter, which functions to sever from the work piece the projecting portion thus gripped and supported by the work support, the work support being mounted to turn about a fixed axis parallel with the axis of rotation of the spindle carrier, and the work clamping devices on the spindle carrier being mounted to turn each about an axis of rotation parallel with the axis of rotation of the spindle carrier and being carried by the latter to aline with the axis of rotation of the work support when the work piece of such clamping device is being operated upon by the cutter, and means turning all of the work clamping devices and the work support at the same axial speed, a tool that functions subsequent to the severing operation of the cutter, which tool is mounted so that it can be moved laterally from a non-functioning position to a position in which it can function when relative, longitudinal movement is effected between it and the work support, and means for moving said tool upon its non-functioning position to and into functioning position in respect to the severed projecting portion while the latter is gripped and rotated by the work support.

12. In an automatic machine tool, the combination with a rotary multiple spindle carrier, a plurality of work-holding spindles revolvably mounted in the carrier, means associated with each work-holding spindle for feeding work in the direction of the axis of turning of the work-holding spindle, a rotary work support having means for clamping a work piece projecting from a work-holding spindle at a time when the particular work-holding spindle is in cooperative position with respect to the rotary work support, mechanism for turning the work-holding spindles in the carrier, mechanism for turning the work support independently of the work at the same angular velocity as that of the work-holding spindle, a severing mechanism for severing a projecting portion of the work, and mechanism operating in timed relation to the severing mechanism for causing the work support to move axially, toward the work-holding spindle in cooperative position with respect to the work support, so as to clamp a projecting portion of the work, so as to support such projecting portion of the work during the entire cutting action, so as to thereafter move axially to carry said severed work piece away from the particular work-holding spindle, and so as to release the severed work piece.

13. The method which comprises forwardly feeding in a longitudinal direction and to a desired position a longitudinally extending piece of stock in the form of a bar or rod, gripping the body portion of said stock so that the forward end portion of the stock projects beyond the locality where the body portion is gripped, bodily moving the gripped stock laterally to successive operative positions and in each of said successive operative positions rotating the stock about its longitudinal axis and performing an operation on said projecting end portion, in the final of said successive positions gripping said projecting end portion which has been operated upon, simultaneously supporting said gripped body portion of the stock and said gripped projecting end portion of the stock and applying forces so as to positively rotate the body portion of the stock at the same angular velocity and about the same longitudinal axis, while thus rotating progressively severing by a transversely moving cutting instrumentality the material in a locality between said gripped and driven localities of said body and end portions in a manner to completely sever the gripped and positively driven projecting end portion from the gripped and positively driven body portion, and subsequently bringing a finishing tool into functioning position by effecting a relative movement which comprises a relative, longitudinal movement as between a finishing tool and the end portion thus severed and which relative, longitudinal movement takes place while the severed end portion rotates about the same longitudinal axis whereby a finishing operation is performed on the rear end of the severed end portion.

14. The method of cutting successive end portions from a longitudinally extending piece of stock in the form of a bar or rod which comprises gripping the body portion of the stock and positively rotating the stock, and gripping so as to insure positive rotating of a projecting end portion of the stock during the time of severing the projecting end portion of the stock from the body portion and for a time after said severing of said end portion has taken place and while a finishing operation is being performed on the severed end portion, said body portion and said projecting end portion each being positively gripped and rotated so that they both turn about the same longitudinal axis and at the same angular velocity, transversely severing while thus rotating the projecting end portion from the body portion while said body and end portions are thus gripped and positively rotated, and causing a finishing tool to be brought into operative relationship with respect to the severed end portion by a transverse movement of the finishing tool which is followed by a relative, longitudinal movement as between the finishing tool and the severed end portion whereby the finishing operation previously referred to is performed on the severed end portion while the latter is gripped and positively rotated about the same longitudinal axis.

W. S. DAVENPORT.